US008884786B2

(12) United States Patent
Beukema et al.

(10) Patent No.: US 8,884,786 B2
(45) Date of Patent: Nov. 11, 2014

(54) ILLUMINATED SIGN FOR DISPLAYING A COMMAND AND/OR NOTICE FOR TAXIING AIRCRAFT TRAFFIC AT AN AIRPORT

(75) Inventors: Martijn Beukema, Brussels (BE); Pierre Tremouroux, Braine-L'Alleud (BE)

(73) Assignee: ADB BVBA, Zaventem (BE)

( * ) Notice: Subject to any disclaimer, the term of this patent is extended or adjusted under 35 U.S.C. 154(b) by 335 days.

(21) Appl. No.: 13/318,242

(22) PCT Filed: Apr. 30, 2010

(86) PCT No.: PCT/EP2010/055940

§ 371 (c)(1),
(2), (4) Date: Jan. 11, 2012

(87) PCT Pub. No.: WO2010/125198

PCT Pub. Date: Nov. 4, 2010

(65) Prior Publication Data

US 2012/0119924 A1 May 17, 2012

(30) Foreign Application Priority Data

Apr. 30, 2009 (DE) ........................ 10 2009 019 288

(51) Int. Cl.

| | |
|---|---|
| ***B64F 1/18*** | (2006.01) |
| ***G08G 5/00*** | (2006.01) |
| ***G09F 13/04*** | (2006.01) |
| ***G09F 13/22*** | (2006.01) |

(52) U.S. Cl.

CPC ................ *G09F 13/04* (2013.01); *G09F 13/22* (2013.01); *Y10S 362/812* (2013.01)

USPC ................ 340/953; 40/541; 40/546; 362/30; 362/84; 362/249.02; 362/246; 362/294; 362/311.02; 362/330; 362/812; 340/815.4; 340/815.45

(58) Field of Classification Search

USPC ................ 340/953, 907, 908, 908.1, 815.45, 340/815.4; 404/22, 619; 40/541, 546; 362/30, 84, 249.02, 246, 294, 311.02, 362/330, 812

See application file for complete search history.

(56) References Cited

U.S. PATENT DOCUMENTS 4,967,317 A * 10/1990 Plumly ........................ 362/613
5,410,453 A 4/1995 Ruskouski (Continued)

FOREIGN PATENT DOCUMENTS

CA 2260583 8/1999
CA 2260583 A1 * 8/1999

(Continued)

OTHER PUBLICATIONS

English machine translation from Espacenet.com, of foreign reference No. DE9412944.

*Primary Examiner* — George Bugg
*Assistant Examiner* — Anthony D Afrifa-Kyei
(74) *Attorney, Agent, or Firm* — Black, McCuskey, Souers & Arbaugh, LPA

(57) ABSTRACT

The invention relates to a light sign (10) for displaying an instruction and/or guidance for ground airplane traffic at an airport, comprising a casing (20) with a transparent display panel (21) for representing an instruction and/or guidance symbol (Z), and a light source arranged inside the casing (20) with at least one luminescent diode (32) for illuminating the display panel (21). A diffusion panel (22) is made for scattering and/or back-scattering incident light, wherein the light source is arranged between the display panel and the diffusion panel. The at least one luminescent diode (32) is aligned on the diffusion panel (22) so that the display panel (21) is not illuminated directly, but indirectly by back-scattering of the light emitted from the at least one luminescent diode by the diffusion panel (22).

25 Claims, 2 Drawing Sheets

(56) References Cited

U.S. PATENT DOCUMENTS

Figure 1:
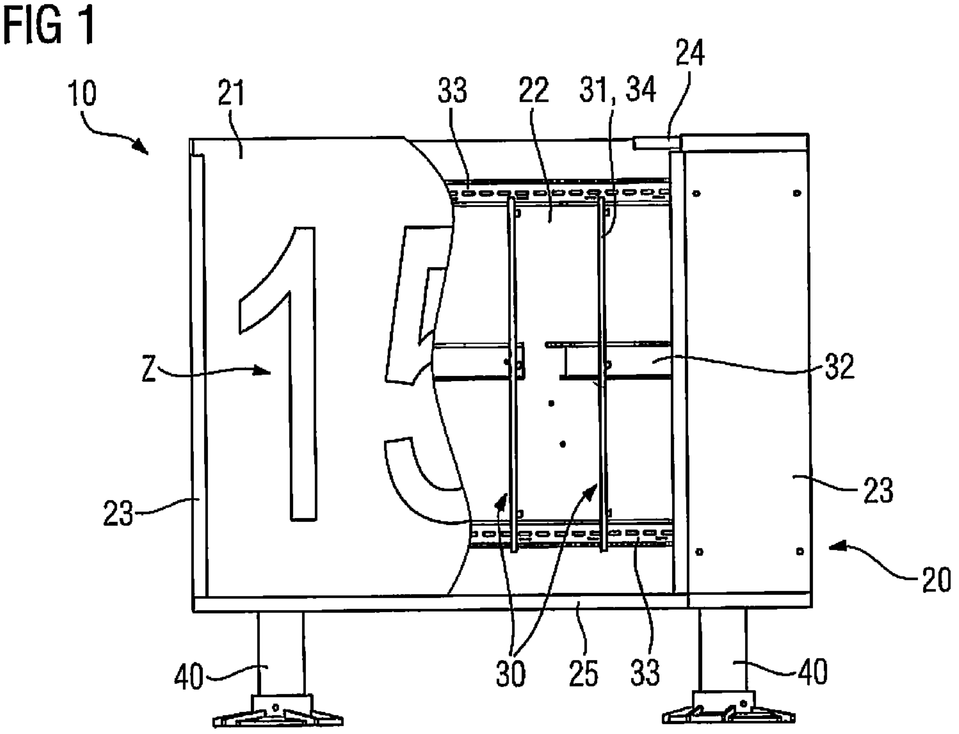

| | | | | |
|---|---|---|---|---|
| 6,282,825 | B1 * | 9/2001 | Godfrey et al. | 40/611.01 |
| 6,603,243 | B2 * | 8/2003 | Parkyn et al. | 313/113 |
| 7,153,013 | B2 * | 12/2006 | Pederson | 362/543 |
| 2004/0097195 | A1 * | 5/2004 | Selleck | 455/41.3 |
| 2006/0259232 | A1 * | 11/2006 | Huthoefer et al. | 701/120 |
| 2007/0040512 | A1 * | 2/2007 | Jungwirth et al. | 315/159 |
| 2008/0129923 | A1 * | 6/2008 | Hu | 349/64 |

FOREIGN PATENT DOCUMENTS

| | | |
|---|---|---|
| DE | 9412944 | 10/1994 |
| WO | WO 02/089101 A1 | 11/2002 |
| WO | WO 02089101 A1 * | 11/2002 |

* cited by examiner

ILLUMINATED SIGN FOR DISPLAYING A COMMAND AND/OR NOTICE FOR TAXIING AIRCRAFT TRAFFIC AT AN AIRPORT

CROSS-REFERENCE TO RELATED APPLICATIONS

This application is the U.S. National Stage of International Patent Application No. PCT/EP2010/055940 having the international filing date of Apr. 30, 2010, which claims priority to German Patent Application No. 102009019288.3, filed on Apr. 30, 2009. All of which are incorporated herein by reference.

This invention relates to a light sign for displaying an instruction and/or guidance for taxiing airplane traffic at an airport according to the preamble of patent claim 1.

Such light signs are arranged on the taxiways and in the maneuvering area at airports, and must comply with international standards regarding size, photometric values, protection class, and the like, as specified for instance in Appendix 14, Vol. 1, Chapter 5.4 as well as in Enclosure 4 of the ICAO (abbreviation of: International Civil Aviation Organization). Basically, there are mandatory instruction signs and operational guidance signs. Instruction signs are used for identifying a location trespassing of which requires an authorization from the control tower. The respective instruction symbols are represented in white on a red background. Examples are taxiway stop line signs, runway stop line signs, signs for displaying the landing strip category Cat I, II, and III, runway designation signs, and "NO ENTRY" signs. All other signs are guidance signs for displaying information. Road signs show target designations with arrows, with the guidance symbols being represented in black on a yellow background. Location signs designate the currently used taxiway, with direction symbols being represented in yellow on a black background. So-called runway residual distance markers are special guidance signs, with the direction symbols thereof being represented in white on a black background.

Various light sources are used for internally illuminated signs. From the product description "PVO: Internally Illuminated Guidance Signs with fluorescent lamps (A.04.251e)," issued by ADB—A Siemens Company under order number E10001-T95-A51-V2-7600, use of a fluorescent lamp as a light source is known. It is characterized by a high light efficiency of up to 100 lm/W, and is thus one of the most efficient light sources for internally illuminated signs. However, the durability thereof is typically limited to less than 10,000 h. Furthermore, the series resistor of the light source may cause high frequency distortions in the constant power grid. Such distortions may for instance impair communication signals superimposed on the current signal. Another disadvantage of fluorescent lamps is due to the varying switching times thereof, thereby increasing time from startup until the sign is fully operational. Typically, full operation is only reached after a warm-up time of about one minute. Yet another disadvantage is the high reactive load of the ballast on the primary circuit, which limits the total number of light signs in a circuit. Finally, one disadvantage is the decreased functionality at low temperatures, which is noticeably both in switching times and in light efficiency.

On the other hand, from the product description "PVH: Internally Illuminated Guidance Signs with halogen lamps (A.04.255e)," issued by ADB—A Siemens Company under order no. E10001-T95-A96-V1-7600, use of halogen lamps as a light source is known. In particular, tungsten halogen lamps are implemented in environments with low temperature conditions. However, halogen lamps suffer from significantly low durability, typically of 1500 h, as well as from low light efficiency of about 25 lm/VV or even less. In fact, such light sources have instantaneous switching times, but they take quite a long time, e.g. 1.5 min or more, to reach full functionality regarding light intensity and color location. This precludes using such light sources in applications where a quick response time is required, as for instance in variable signs.

For some airfield applications, brightness control of the light source is required in order to comply with the relevant international standards. Dimming of fluorescent lamps is hardly possible, especially not at low temperatures. On the contrary, dimming of halogen lamps is easy, even at low temperatures. However, halogen lamps have the shortcoming that at low currents, a considerable shift of the color location towards yellow can be noted, resulting in a deterioration of color contrast. E.g., in instruction signs representing white symbols on a red background, letters will appear more yellowish while red will turn to orange.

On the contrary, the product description "PVO-LED: Innenbeleuchtete Rollwegweiser, Hinweis-Standortzeichen" issued October 2007 by Siemens Bacon Vienna, discloses the implementation of luminescent or light emitting diodes, hereafter abbreviated by LED, as a light source. The light emitting diodes are arranged inside the casing of the light sign and backlight the display panel through direct radiation. In case of failure of single light emitting diodes of the light source, this light sign suffers from the shortcoming that this implies visible destruction of lighting homogeneity. In the worst case, uniformity of illumination required by international standards can no longer be maintained. The number of light emitting diodes used in the known light sign is defined by the size of the display panel, the spacing between the light emitting diodes and the display panel, as well as by the radiation pattern of the light emitting diodes. For this reason, it is not possible to freely reduce the number of light emitting diodes used, such as by implementing light emitting diodes of high light intensity or light emitting diodes of better light efficiency.

Knowing that light emitting diodes are to be considered as punctual light sources, any object in the light path between the light source and the display panel will produce distinct shadows on the display panel. Such distinct shadows may lead to misinterpretations of the instruction or guidance represented on the display panel. Another disadvantage when using light emitting diodes for direct lighting occurs when they are retrofitted into a light sign, which was originally designed for using a fluorescent lamp as a light source. Thus, for instance, transmission of the blue fraction of the light spectrum emitted by a LED may be visible through a yellow or red display panel. Thereby, the LED light source appears in a different color through the display panel, as for instance purple in a red display panel. Furthermore, the transmission factor for the LED spectrum is too small for display panels which are designed for fluorescent lamps or halogen lamps as a light source.

The invention is based on the object of providing a light sign of the type mentioned in the beginning, which overcomes said disadvantages while maintaining the beneficial implementation of luminescent diodes as a light source.

The object according to the invention is solved by a generic light sign having the features mentioned in the characterizing part of patent claim 1. The light sign has a diffusion panel configured for scattering and/or back-scattering incident light, wherein the at least one luminescent diode is aligned on the diffusion panel so that the display panel is illuminated by the scattered light of the diffusion panel. Thus, an essential feature of the inventive light sign consists in indirectly back-lighting the display panel with one or several light emitting diodes, wherein, due to their alignment, emitted light is first mainly incident on the diffusion panel and is scattered and/or back-scattered by it, so as to illuminate the display panel from the inside of the casing. Due to the spacing between diffusion panel and display panel, the latter is illuminated by a significantly larger virtual light source. The indirect scattered lighting reduces or even avoids distinct shadows cast on the display panel due to objects arranged in the light path between diffusion panel and display panel. Only partial and self-shadows are visible, causing only soft variations in luminosity on the display panel. Thus, when retrofitting existing light signs with indirect light sources according to the invention, existing objects may stay inside the casing, thereby considerably reducing downtime for retrofitting. The indirect scattered lighting considerably promotes uniform coloring on the display panel. The indirect scattered lighting also allows for a more consistent color location to be obtained throughout the display panel, thereby preventing irritations in color perception. A particular advantage of the indirect scattered lighting is the fact that functionality of the light sign is maintained in case of failure of single or even several luminescent diodes, because contrast with background light is lower than under direct lighting. Thereby, standard conditions can still be met even in case of failure of single LEDs. Also, under indirect scattered lighting, hot spots due to locally high power density on the LED semiconductor chip are not visible on or through the display panel. Finally, under indirect scattered lighting, additional optical elements, as for instance light guides or beam splitters, can be omitted.

In a preferred configuration of the inventive light sign, the diffusion panel is made as a back panel and the display panel is made as a front panel of the casing, wherein the diffusion panel is provided with a scattering coat for back-scattering incident light. Herein, the diffusion panel is opaque, but on the inside provided with a scattering coat back-scattering incident light. Application of a diffusion coating on the back panel virtually increases the surface of the light emitting diodes. Back-scattering is also essential for the homogeneity of illumination of the display panel, for soft shadow outlines as well as for a more consistent color location, and uniform coloring. Preferably, the casing has two side panels, one top panel, and one bottom panel, which are either also provided with a scattering coat or advantageously made to be internally highly reflective. In the latter variant, polished metal or a highly reflective coating with low scattering properties may be used. This allows for an increase in luminosity, in particular at the edge of the display panel.

In an advantageous embodiment of the inventive light sign, the diffusion panel is arranged inside the casing between a front panel and a back panel of the casing, and the back panel and front panel are made as display panels. The at least one luminescent diode is arranged between the back panel and the diffusion panel. Herein, several variants are possible:

- The diffusion panel is made to be opaque, but back-scattering from both sides. The front panel and back panel are made as display panels, wherein light sources are arranged on both sides of the diffusion panels, which can be driven separately from each other. Thus, the light sign can be used for a variable display on the front and back side.
- The diffusion panel is made to be translucent or semitranslucent, wherein the front and back panels are made as display panels. The light source can be arranged on one side only or on both sides of the diffusion panel, so that the display panels are illuminated by reflected and/or passing scattered light.

Preferably, the diffusion panel of the inventive light sign has color pigments, the distribution of which determines a color location of the display panel.

In an advantageous configuration of the inventive light sign, the display panel has a pane and applied thereto a foil which is color-configured according to the instruction and/or guidance symbol to be represented. The pane consists of special Plexiglas having a thickness of 5 mm, such as transparent polycarbonate, while the foil glued to the inside or outside is a color coat with Lambert radiator properties. Alternatively, the display panel may receive the color configuration thereof by a color coat applied to the pane or by coloring of the pane.

In a preferred embodiment of the inventive light sign, the at least one luminescent diode is constituted as a high performance light emitting diode. The high performance light emitting diode is supplied with a nominal current of at least 100 mA, and has a light intensity of at least 20 lm. Light efficiency may also increase up to 100 lm/W, allowing a limitation to a smaller number of LEDs, so as to meet the luminosity levels required by standards. In comparison with conventional light sources, such as fluorescent and incandescent lamps, the luminescent diodes have a substantially longer durability of more than 30,000 h, more than 50,000 h, or even more than 100,000 h. Luminescent diodes are operational even at low temperatures below 0° C., preferably even below −40° C., by having very short switching times, and light output and setting of the color location occurring instantaneously. Moreover, luminescent diodes can be adjusted in luminosity without any shift in color location. High performance light emitting diodes have low thermal resistance, e.g. of 10 K/W, making it much easier to achieve heat dissipation, for instance by allowing for small base solutions for the heat sink. Heat sinks having a reduced base will decrease self-shadowing on the display panel, thereby improving light efficiency of the light emitting diodes. Moreover, low thermal resistance of the light emitting diodes contributes to increasing the durability thereof, which is directly dependent on the base temperature and the impinging flux current. In comparison with conventional light sources, e.g. a fluorescent lamp, an instruction sign operated with high performance light emitting diodes only consumes ⅔ of current. Low heat losses only moderately warm up the light sign, thereby not only increasing the durability of the light emitting diodes, but also that of the color sheet on the display panel. Furthermore, the low voltages, at which the light emitting diodes are operated, significantly decrease the risk of human accidents. As an alternative to high performance light emitting diodes, it is also possible to implement ultra-bright light emitting diodes emitting a light intensity of 10 lm, e.g., with a power consumption of 200 mW. Ultra-bright light emitting diodes may be arranged close to each other in order to obtain luminosity properties comparable with high performance light emitting diodes.

In a preferred embodiment of the inventive light sign, the at least one luminescent diode is made as a Lambert radiator for radiating white light. Currently, white light emitting diodes reach a light efficiency which is comparable to that of fluorescent lamps. As is well-known, generating white light is based for instance on a phosphorous-based conversion of blue into white light. White light emitting diodes are commercially available, namely with different lenses or also without any external lens. Both inorganic and organic light emitting diodes may be implemented, but also so-called potential well light emitting diodes. The Lambert radiation characteristic is particularly suited for indirect illumination. The maximum light output thereof occurs vertically to the printed circuit board, wherein beam directions varying from this main direction are diminished by the cosine of the angle of deflection. Alternatively, it is possible to implement side emitting surface radiators or radiators having a batwing characteristic in the shape of batwings.

In a preferred configuration of the inventive light sign, the at least one luminescent diode is covered by a transparent protective coat. The protective coat is highly transparent so that transmission losses thereof may be low. It may consist for instance of polycarbonate or PMMA and is used for protecting the light emitting diodes from dust and dirt, which could considerably impair the light intensity of the light emitting diodes.

In an advantageous configuration of the inventive light sign, the light source comprises luminescent diodes arranged as in a matrix. The matrix is for instance a surface array, which is aligned in parallel to the back panel or the display panel. Alternatively, the matrix may also be arranged laterally at the side, top, or bottom panel, or also at a combination thereof. Preferably, the luminescent diodes are then arranged in equidistantly spaced units from each other, e.g. in a row and column pattern. The matrix array facilitates highly homogeneous illumination of the display surface in order to meet the requirements of international standards. They require a factor of uniformity between neighboring measuring points which must not exceed 1.5. Due to the matrix arrangement, the light source may be adapted easily to the type and size of the respective light sign, of which there are more than 70 in the airfield area. Also, the density of the light emitting diode array can be changed easily by adapting the spacing unit. E.g., guidance signs require a lower light emitting diode density than instruction signs. Thus, easy adaptation to future developments in the LED technique regarding light intensity and light efficiency of the light emitting diodes is also ensured. Thereby, it is also possible to provide different variants of instruction, guidance, and in particular location signs, which is useful for saving power costs, because for instance guidance signs require 20% less power than instruction signs.

Preferably, at least some of the luminescent diodes of an inventive light sign have an optical element for beam shaping. This allows for the luminosity level of the light source to be improved, for instance at the edge of the display panel.

It is also preferred that the luminescent diodes of an inventive light sign have a higher light intensity at the matrix edge than the luminescent diodes inside the matrix. Thus, it is possible to use more expensive high performance light emitting diodes at the edge, while inside the matrix more cost-effective light emitting diodes may be installed. Thereby, luminosity variations can also be reduced by adjusting neighboring measuring points in a more uniform manner.

Alternatively, at least one luminescent diode in the middle of the matrix has greater light intensity than the luminescent diodes at the edge of the matrix. Text for the instruction symbol (white letters on a red background) and the guidance symbol (yellow letters on a black background) is represented in the middle of the display panel, and thus, the luminosity of the symbols may be increased by using light emitting diodes of greater light intensity in the middle of the light matrix.

In another preferred configuration of the inventive light sign, the matrix has several separately interchangeable matrix modules with luminescent diodes. On the one hand, this simplifies the composition of different size light emitting diodes matrixes, and on the other hand, modularity facilitates the possibility of retrofitting existing signs, as well as maintenance of light signs made according to the invention.

Preferably, a matrix module of an inventive light sign has a printed circuit board fitted with luminescent diodes, which can be fastened to a holding device inside the casing. Easy retrofitting of existing signs is ensured, if both conventional light sources and inventive matrix modules of light signs can be fastened to the holding device.

Advantageously, the transparent protective coat extends over the matrix module in order to cover all of the luminescent diodes arranged thereon, e.g. like a cap or lid.

In another preferred embodiment of the inventive light sign, the latter comprises a heat sink connected in a thermally conductive way to the luminescent diode(s) in order to dissipate heat. The heat sink is used substantially for temperature control, which is essential in particular when using high performance light emitting diodes.

Preferably, the heat sink of an inventive light sign has a metal core arranged in the printed circuit board. The metal core printed circuit board, abbreviated as MCPCB, is then made to be narrow, preferably approximately as wide as the smallest width of the LED casing. The metal core acts as a heat sink and heat dissipator, with the narrow configuration leading to a small self-shadow only on the display panel when the module is mounted in the light path of the light emitting diodes.

More preferably, the heat sink of an inventive light sign comprises a ribbed metal profile arranged adjacent to the printed circuit board. The heat transfer properties are improved if an additional heat sink as a ribbed metal profile is mounted in addition to the metal core of the printed circuit board. This improves the durability of the luminescent diodes, in particular at high currents. In particular, luminescent diodes having a largely reduced base can be mounted on thin metal core printed circuit board strips, thereby improving heat dissipation. Thus, additional heat sinks may have smaller dimensions, further improving heat dissipation. Additional heat sinks can be enlarged in the direction vertical to the printed circuit board, without causing photometric losses at the display panel.

In another particularly advantageous configuration of the inventive light sign, the latter comprises a control device for controlling the luminosity of the at least one luminescent diode. Implementing luminescent diodes as a light source allows for continuous dimming, for instance by pulse width modulation of the LED power supply, without thereby shifting the color location.

In yet another advantageous configuration of the inventive light sign, the latter comprises a monitoring device for functional monitoring of the light source. Thereby, the time and cost-intensive personal inspection by maintenance personnel may be omitted, minimizing maintenance time and downtime, and consequently downtime of the airfield facility.

Preferably, the monitoring device of an inventive light sign comprises at least one photodiode for detecting the light emitted by the at least one luminescent diode. By attaching a photodiode to the LED's printed circuit board strip, constant worsening of the light intensity of the light emitting diodes can be detected, which is usually a very slow deterioration process.

Advantageously, the monitoring device of an inventive light sign comprises measuring means for determining current and/or voltage of the at least one luminescent diode. An instantaneous LED failure of one or more matrix modules may result in the loss of uniform luminosity distribution on the display panel. The electronic monitoring circuit detects such disastrous failures so that they may be eliminated immediately.

In yet another preferred configuration of the inventive light sign, the casing is divided by at least one partitioning panel into at least a first and a second casing part, wherein the first casing part has a first light source and a first display panel, and the second casing part has a second light source and a second display panel, and wherein the first and second light sources can be driven separately so that the light sign is made for variably displaying a first or second instruction and/or guidance by the first or second display panel. Such variable signs can be implemented to great advantage especially at night.

Figure 2:
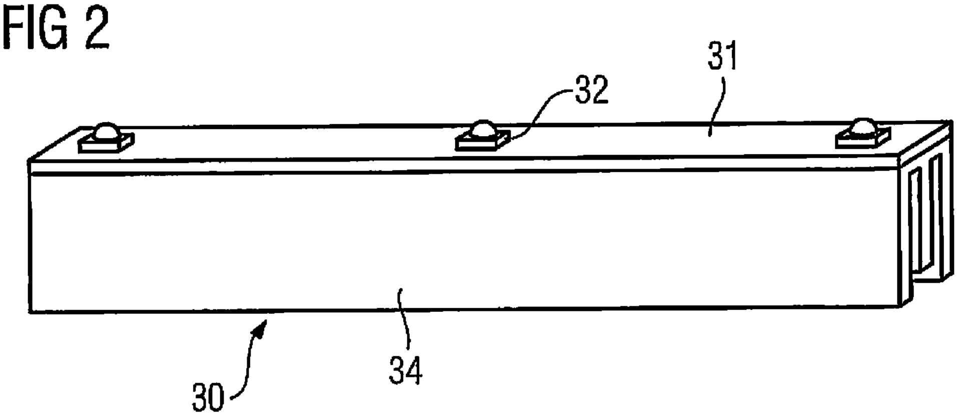
Figure 3:
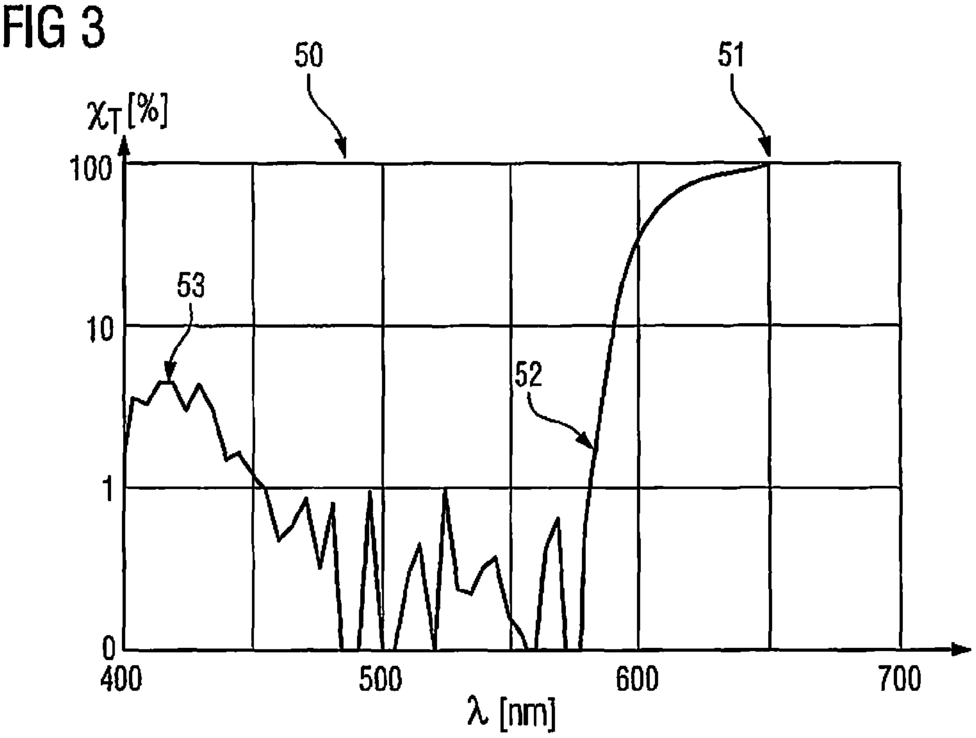
Figure 4:
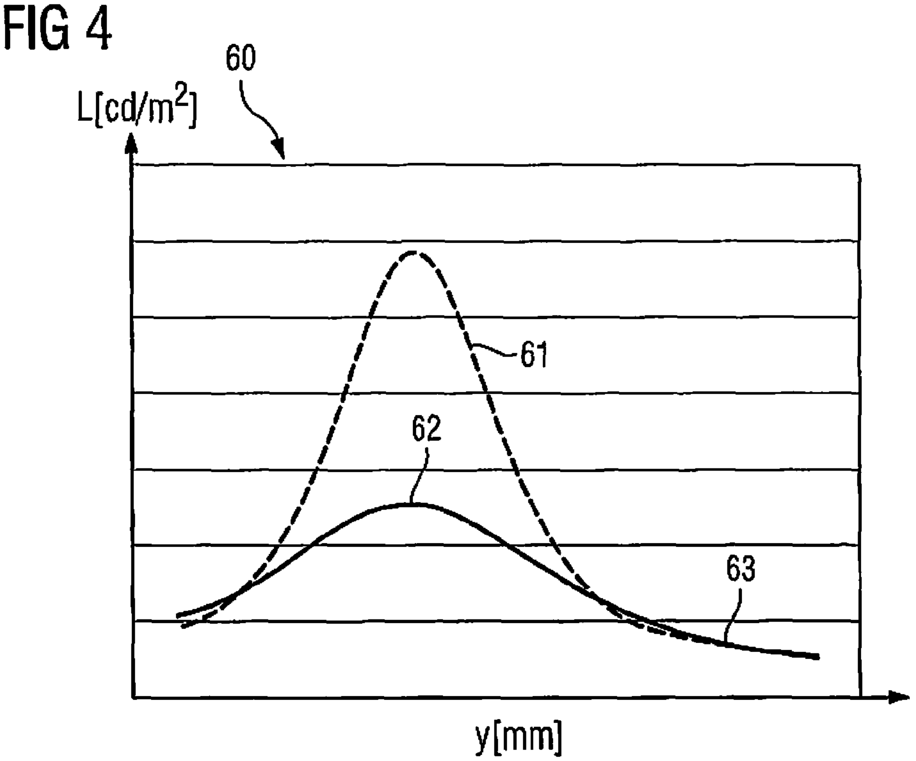

An example embodiment of the invention will be explained hereafter more in detail by means of the drawings:

FIG. 1 schematically shows an inventive light sign in a partial sectional view, FIG. 2 schematically shows a matrix module of an inventive light sign, FIG. 3 schematically shows a transmission spectrum of a display panel, and FIG. 4 schematically shows the light density gradient of a luminescent diode on the display panel.

According to FIG. 1, an inventive light sign 10 comprises a box-shaped casing 20 with a front translucent display panel 21, with a back panel 22 arranged opposite thereof, with two opposite side panels 23, with a removable top panel 24, and with a bottom panel 25 arranged opposite thereof. Except for the display panel 21, the casing 20 consists of metal because of the advantageous thermal resistance between a light source arranged inside the casing 20 and the external ambient air. Alternatively, the casing 20 can also be made of organic material, e.g. of glass-fiber reinforced plastic. The display panel 21 comprises a front pane, e.g. made of acrylic glass having a thickness of 5 mm or of transparent polycarbonate, and a foil applied on the inside, color-configured according to the instruction or guidance symbol Z to be represented. The color foil can be glued on and has Lambert radiator properties. For backlighting of the display panel 21, the light source with a plurality of luminescent diodes 32 is arranged inside the casing 20. The casing 20 of the light sign 10 is placed on two legs 40 with shearing coupling.

According to the invention, the display panel 21 is illuminated by the luminescent diodes 32, not directly, but indirectly, by back-scattering from the back panel made as a diffusion panel 22, of the light emitted by the luminescent diodes. For this purpose, the back panel 22 is provided with a scattering coat back-scattering incident light. This diffusive coat is preferably made as a polyester powder coating with a satin surface finish, e.g. with a gloss level of 60%. The gloss level has an impact on the adhesive tendency of the protection, which is to be minimized and which is to be considered as particularly important in the indirect illumination provided according to the invention. On the contrary, the side panels 23 as well as the bottom and top panels 25, 24 are made of polished metal or have a highly reflective coating with low scattering properties in order to increase luminosity at the edge of the display panel 21.

The light source preferably has high performance light emitting diodes, which are arranged as a matrix. The matrix comprises several vertically aligned matrix modules 30 arranged adjacent to each other inside the casing 20 and respectively fastened to a holding device 33. The matrix modules 30 can be plugged in and are separately interchangeable. Thereby, the luminescent diodes 32 on one plane are arranged in equidistant units, which are aligned in parallel between the display panel 21 and the back panel 22.

According to the invention, the luminescent diodes 32 are then aligned on the back panel 22 so that light emitted thereby is at least partially reflected by the back panel 22 and illuminates the display panel 21. Thereby, the display panel 21 is indirectly illuminated by a virtual light source reproduced on the back panel 22 and which is significantly larger than the actual light source. Due to the indirect back-scattering on the back panel 22, failure of single luminescent diodes 32 on the display panel 21 is not visible or at least less visible than with direct illumination. This also applies for shadows cast by objects which are arranged in the light path between back panel 22 and display panel 21, of which only half-shadows or self-shadows, and thus only slight variations of luminosity, are visible in an application according to the invention. The indirect back-scattering according to the invention also implies high consistency of the color location throughout the display panel 21, thereby preventing irritations in color perception. The scattering coat itself also increases the surface of the virtual light source projected onto the back panel 22. Globally, according to the invention, a very high uniformity of light density is obtained throughout the display panel 21.

In this respect, we also refer to FIG. 4 showing the gradient 60 of light density L of a luminescent diode 32 vs. the vertical position y on the display panel 21. The dotted line 61 shows the gradient of the light density L under direct illumination of the display panel 21 by a luminescent diode 32, while the continuous line 62 shows the gradient under indirect illumination. The peaks of both curves coincide in the vertical position of the considered luminescent diode 32, but have a different height. At a sufficient distance from the position of the luminescent diode 32, both curves 61 or 62 go down to the value of the background lighting 63, which consists of reflection and scattering inside the casing. The invention takes advantage of the low light density difference between the peak under indirect illumination 62 and the background lighting 63, which the significantly lower than the luminosity contrast between the peak under direct illumination 61 and the background 63. Therefore, the failure of such a luminescent diode 32 is substantially less critical under indirect illumination than under direct illumination. The functionality of the inventive light sign and consequently the availability of the associated taxiway are thus higher than in the state of the art.

The modularity of the matrix-shaped light source offers great benefits. The surface density of the luminescent diodes 32 can be set both via the spacing of the luminescent diodes 32 on a matrix module 30 and via the spacing of the single matrix modules 30 with respect to each other. This also allows for simple adaptation of the light source to different size inventive light signs, of which there are for instance more than 70 in the airfield area. Instruction signs for instance require a higher light density than guidance signs. However, both require highly homogeneous illumination of the display panel 21 in order to meet the requirements of international airport standards. The factor of uniformity between neighboring measuring points must not exceed the value of 1.5.

Advantageously, the light emitting diodes 32 at the matrix edge have greater light intensity than the luminescent diodes 32 in the middle of the matrix. Thereby, light density at the edge of the display panel 21 can be improved.

Alternatively, at least one luminescent diode 32 in the middle of the matrix has greater light intensity than the luminescent diodes 32 at the edge of the matrix.

In the represented sample embodiment, the luminescent diodes 32 are made as high performance light emitting diodes. They are supplied with a nominal current of at least 100 mA and have a light intensity of at least 20 lm. Also, light intensities of more than 100 lm are possible, whereby the number of light emitting diodes 32 necessary for the light density to be achieved according to standards can be decreased. In addition to a very good durability, the light emitting diodes 32 are characterized by the functionality thereof, even at very low temperatures. They have very short switching times and, regarding light output and color location, they are fully operational instantly. E.g., the LED types K2 of Philips Lumileds or the type XR-E of CREE are particularly suitable. The low thermal resistance of such light emitting diodes simplifies thermal dissipation in light signs 10 according to the invention; furthermore, it contributes to increased durability of the light emitting diodes 32. The low power consumption of high performance light emitting diodes 32 is another advantage.

The luminescent diodes 32 are made for radiating white light as a Lambert radiator. Nowadays, they have a light efficiency comparable with that of a fluorescent lamp. E.g., the white light is produced by a phosphorous-based conversion of blue light. Advantageously, in the represented sample embodiment, an external lens in front of the light diode 32 is omitted.

However, the luminescent diode 32 is covered by a transparent protective coat. The coat consists of highly transparent material, e.g., of polycarbonate or PMMA, in order to keep transmission losses low. The protective coat keeps dust and dirt away from the light emitting diodes 32, which could otherwise impair light intensity thereof.

FIG. 2 shows a matrix module 30 of the light source of a light sign 10 according to the invention. The module 30 comprises a strip-shaped printed circuit board 31, on which the high performance light emitting diodes 32 are arranged at equidistant intervals.

The printed circuit board 31 is made as an MCPCB, thus comprising a metal core as a heat sink, which is not explicitly represented in FIG. 2. The width of the printed circuit board strip 31 does not have a substantially larger dimension than the LED casing as such. Thereby, the matrix module 30 inserted into the casing 20 will only cast a small shadow. Due to the reduced self-shadowing of the display panel 21, the light efficiency of the light source is improved.

The heat transfer properties of the printed circuit board 31 are further improved by an additional heat sink made as a ribbed metal profile 34, which is connected to the printed circuit board 31 in a thermally conductive manner. Herein, the rib profile extends in a direction vertical to the printed circuit board 31 and thus in parallel to the main light path between the back panel 22 and the display panel 21. This configuration of the metal profile 34 also allows for keeping self-shadowing of the matrix modules 30 low.

The high performance light emitting diodes 32 have a Lambert radiation characteristic, the maximum light radiation of which is vertical to the printed circuit board 31.

Advantageously, the protective coat extends over the matrix module in order to cover all of the luminescent diodes arranged thereon. This results in a smooth surface above the matrix module preventing the accumulation of dust and dirt and allowing for dirt to be wiped off easily. The protective coat may also be provided as a cap or lid for one or more matrix modules.

Not represented is a controller by means of which the light source can be dimmed continuously. The controller adjusts the luminosity of the light emitting diodes 32, such as by pulse width modulation of the LED power supply. Advantageously, this does not produce a shift in color location.

Also not represented is a monitoring device for functional monitoring of the light source. This comprises on the one hand photodiodes arranged on the printed circuit board 31, in order to monitor light emitted by the light emitting diodes 32. If the light intensity of a light emitting diode 32 diminishes in time, then an adequate warning is output to the maintenance center. Moreover, the monitoring device comprises means for measuring the current intensity and voltage of the light emitting diodes 32. The failure of single light emitting diodes 32 or a complete matrix module 30 is also reported to the maintenance center so that the functionality according to standards of an inventive light sign 10 can be restored as soon as possible.

Another advantage of the light sign 10 according to the invention will be further explained with reference to FIG. 3. Here, the transmission spectrum 50 of a display panel 21 with a red-colored sheet for an instruction sign is plotted. The spectrum is scaled to the value 100, which is reached at 51, i.e. the wavelength λ of a 650 nm red color. Below the cut-off wavelength 52, which is located somewhat below 600 nm for a wavelength λ, light with lower wavelengths is substantially filtered out, which is equivalent to the effect of a low-pass. However, the transmission spectrum between 400 nm and 450 nm has a transmission peak 53. The emission spectrum of the light emitting diodes 32 used according to the invention shows a maximum at about 450 nm, which, due to the transmission peak 53 in the transmission spectrum, would be visible in any case under direct illumination of the display panel 21. This problem of direct illumination is apparent in particular when high performance light emitting diodes are used, which emit photons having a substantially smaller surface than for instance fluorescent lamps. Thus, under direct illumination, it may happen that the blue maximum of the high performance light emitting diodes is perceived on the red display panel in a different color, such as purple.

The invention claimed is:

1. A light sign for displaying an instruction and/or guidance for taxiing airplane traffic at an airport, comprising:
- a casing with a translucent display panel for representing an instruction and/or guidance symbol,
- a light source arranged inside the casing with at least one luminescent diode for illuminating the display panel, and
- a diffusion panel, which is configured for scattering and/or back-scattering of incident light,
- wherein the light source is arranged between the display panel and the diffusion panel,
- wherein the light source is positioned at a distance from the diffusion panel such that reflected light is substantially similar to a value of background lighting,
- wherein the light source is positioned at a distance from the display panel to reduce a shadow from the light source on the display panel,
- wherein the at least one luminescent diode is aligned on the diffusion panel in such a way that the display panel is not directly but indirectly illuminated by the at least one luminescent diode by back-scattering of the light emitted from the at least one luminescent diode by the diffusion panel.

2. The light sign according to claim 1, wherein the diffusion panel is constituted as a back panel, and the display panel is constituted as a front panel of the casing, and wherein the diffusion panel is provided with a scattering coat for back-scattering incident light.

3. The light sign according to claim 1, wherein the diffusion panel is arranged inside the casing between a front panel and a back panel of the casing and is constituted to be semi-translucent or translucent, and wherein the back panel and the front panel are constituted as display panels, wherein the at least one luminescent diode is arranged between the back panel and the diffusion panel so that the front panel is illuminated by scattered light passing through.

4. The light sign according to claim 1, wherein the diffusion panel comprise colour pigments, the distribution of which determines a colour location of the display panel.

5. The light sign according to claim 1, wherein the display panel comprises a pane and a foil applied thereto, which is colour-configured according to the instruction and/or guidance symbol to be represented.

6. The light sign according to claim 1, wherein the at least one luminescent diode is constituted as a high performance light emitting diode.

7. The light sign according to any of the claim 1, wherein the at least one luminescent diode is constituted as a Lambert radiator for radiating white light.

8. The light sign according to claim 1, wherein the light source comprises luminescent diodes arranged in the form of a matrix.

9. The light sign according to claim 8, wherein at least part of the luminescent diodes comprises an optical element for beam shaping.

10. The light sign according to claim 8, wherein the luminescent diodes at an edge of the matrix have higher light intensity than the luminescent diodes inside the matrix.

11. The light sign according to claim 8, wherein at least one luminescent diode in a middle part of the matrix has a higher light intensity than the luminescent diodes at an edge of the matrix.

12. The light sign according to claim 8, wherein the matrix comprises several separately interchangeable matrix modules with luminescent diodes.

13. The light sign according to claim 12, wherein a matrix module comprises a transparent protective coat covering the luminescent diodes of the matrix modules.

14. The light sign according to claim 12, wherein at least one of the matrix modules comprises a printed circuit board equipped with the luminescent diodes, the matrix module being configured for being fastened to a holding device inside the casing.

15. The light sign according to claim 1, comprising a heat sink, which is connected in a thermally conductive manner to the luminescent diode(s) for dissipating heat.

16. The light sign according to claim 15, wherein the heat sink comprises a metal core arranged in the printed circuit board.

17. The light sign according to claim 15, wherein the heat sink comprises a ribbed metal profile arranged adjacent to the printed circuit board; and wherein the ribbed profile extends in a direction that is parallel to a light path between the luminescent diodes and the diffusion panel.

18. The light sign according to claim 1, comprising a controlling device for adjusting a luminosity of the at least one luminescent diode.

19. The light sign according to claim 1, comprising a monitoring device for functional monitoring of the light source.

20. The light sign according to claim 19, wherein the monitoring device comprises at least one photodiode for detecting the light emitted by the at least one luminescent diode.

21. The light sign according to claim 19, wherein the monitoring device comprises a measuring device for determining the current and/or voltage of the at least one luminescent diode.

22. The light sign according to claim 1, wherein the casing is divided by at least one partitioning wall into at least a first and a second casing part, wherein the first casing part comprises a first light source and a first display panel, and the second casing part comprises a second light source and a second display panel, and wherein the first and second light sources can be driven separately in such a way that the light sign is configured for alternatively displaying a first or second display panel.

23. The light sign according to claim 1, wherein the diffusion panel is provided with a scattering coat for back-scattering incident light.

24. The light sign according to claim 1, further comprising:

a holding device;

wherein the light source comprises a plurality of modules having a plurality of luminescent diodes;

wherein the plurality of modules are fastened onto the holding device adjacent to one another wherein the plurality of luminescent diodes are positioned at a distance from the diffusion panel such that reflected light is substantially similar to a value of background lighting; and wherein the plurality of luminescent diodes are positioned at a distance from the display panel to reduce shadows from the holding device and the plurality of modules on the display panel.

25. A light sign, comprising:

a casing with a translucent display panel for representing an instruction and/or guidance symbol, a light source arranged inside the casing with a plurality of luminescent diodes for illuminating the display panel, and a diffusion panel, which is configured for scattering and/or back-scattering of incident light, wherein the light source is arranged between the display panel and the diffusion panel;

wherein the light source is at a distance from the diffusion panel and directed towards the diffusion panel where back scattering light from the diffusion panel creates a virtual light source;

wherein the virtual light source has a size corresponding to the size of the diffusion panel in order to reduce shadows cast on the display panel by objects arranged in a light path between the diffusion panel and display panel such that the sign has a light output uniformity which complies with International Civil Aviation Organization and Federal Aviation Administration standards.

* * * * *